(12) United States Patent
Sacks et al.

(10) Patent No.: US 6,249,392 B1
(45) Date of Patent: Jun. 19, 2001

(54) HEAD INSTABILITY DETECTION METHOD AND APPARATUS

(75) Inventors: Alexei H. Sacks, St. Louis Park; Timothy F. Ellis, Tonka Bay, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/078,179

(22) Filed: May 13, 1998

Related U.S. Application Data

(63) Continuation-in-part of application No. 09/017,442, filed on Feb. 2, 1998.
(60) Provisional application No. 60/057,140, filed on Aug. 28, 1997.

(51) Int. Cl.⁷ .................................................. G11B 27/36

(52) U.S. Cl. ............................. 360/31; 360/75; 324/210

(58) Field of Search ........................... 360/25, 31, 75, 360/65, 53, 46; 327/336, 345, 356; 324/210

(56) References Cited

U.S. PATENT DOCUMENTS

| | | | |
|---|---|---|---|
| 5,117,408 | * 5/1992 | Weispfenning et al. | 360/77.05 X |
| 5,301,080 | 4/1994 | Ottesen et al. | 360/113 |
| 5,367,409 | 11/1994 | Ottesen et al. | 360/32 |
| 5,586,144 | 12/1996 | Kahlman et al. | 375/229 |
| 5,677,802 | 10/1997 | Saiki et al. | 360/51 |
| 6,025,712 | * 2/2000 | Mian | 360/31 |

FOREIGN PATENT DOCUMENTS

| | | |
|---|---|---|
| 359033618A | 2/1984 | (JP) . |
| 360070552A | 4/1985 | (JP) . |

* cited by examiner

Primary Examiner—Andrew L. Sniezek
Assistant Examiner—Regina Y. Neal
(74) Attorney, Agent, or Firm—Westman, Champlin & Kelly PA

(57) ABSTRACT

A method and apparatus detects pulse asymmetries in a read signal of a data storage device. The read signal is rectified through multiplication with a rectification signal to produce a product signal. The product signal is integrated to produce integrands indicative of pulse asymmetry. In some embodiments of the present invention, the integrands are compared against a baseline value to determine a performance characteristic of a read head in the data storage device.

14 Claims, 10 Drawing Sheets

HEAD INSTABILITY DETECTION METHOD AND APPARATUS

REFERENCE TO RELATED APPLICATION

The present application claims priority benefits from U.S. provisional application Ser. No. 60/057,140 filed on Aug. 28, 1997 and entitled FILTER CALIBRATION AND HEAD INSTABILITY DETECTION METHOD AND APPARATUS. In addition, the present application is a continuation-in-part of U.S. patent application Ser. No. 09/017,442, pending entitled FILTER CALIBRATION AND HEAD INSTABILITY DETECTION METHOD AND APPARATUS, filed on Feb. 2, 1998.

FIELD OF THE INVENTION

The present invention relates to disc drive servo systems. In particular, the present invention relates to servo read signals in servo systems.

BACKGROUND OF THE INVENTION

Magnetic storage devices store data on magnetic media using write heads that generate small magnetic fields. As a write head passes over a medium, its small magnetic field alters localized magnetic moments on the medium. Data is retrieved from magnetic media using read heads that sense transitions in the localized magnetic fields generated by each of these magnetic moments. In response to each of these transitions, a read head generates electrical pulses that are part of a series of pulses forming a read signal. The pulses are either positive or negative depending on the direction of the magnetic moment transition.

Ideally, a read head produces identically shaped pulses for each transition in the magnetic moment. In general, these pulses should be symmetric about their peaks and should have the same general shape during the entire life of the head. However, improperly manufactured heads or heads that have suffered damage may produce excessively asymmetric pulses, may produce different pulse shapes over time, or may produce inconsistent pulse shapes.

New heads that produce excessively asymmetric pulses or existing heads that begin to produce different or inconsistent pulse shapes are sometimes referred to as unstable heads. An unstable head, although functional, is undesirable since it is more likely to fail or "crash". In fact, before crashing, many stable heads become unstable for a period of time.

Since data can be lost when a head crashes, it is desirable to identify unstable heads before they crash. However, the prior art has not provided a method of detecting unstable but functional heads.

The present invention addresses these and other problems, and offers other advantages over the prior art.

SUMMARY OF THE INVENTION

A method and apparatus detects pulse asymmetries in a read signal of a data storage device. The read signal is rectified through multiplication with a rectification signal to produce a product signal. The product signal is integrated to produce integrands indicative of pulse asymmetry. In some embodiments of the present invention, the integrands are compared against a baseline value to determine a performance characteristic of a read head in the data storage device.

In preferred embodiments of the present invention, the performance of the head is measured several times over the life of the data storage device. Each measurement produces a performance value and excessive changes in the performance values over time indicate that the head is unstable.

BRIEF DESCRIPTION OF THE DRAWINGS

FIG. 4(2) is a timing diagram of filter output 174 before filter 172 of FIG. 3 as been adjusted.

FIG. 4(3) is a timing diagram of qualifier output 182 before filter 172 has been adjusted.

FIG. 4(4) is a timing diagram of delayed signal 190 before filter 172 has been adjusted.

FIG. 4(5) is a timing diagram of clock signal 194 before filter 172 has been adjusted.

FIG. 4(6) is a timing diagram of product signal 196 before filter 172 has been adjusted.

FIG. 5(2) is a timing diagram of filter output 176 before delay calibration.

FIG. 5(3) is a timing diagram of qualifier output 182 before delay calibration.

FIG. 5(4) is a timing diagram of delayed signal 190 before delay calibration.

FIG. 5(5) is a timing diagram of clock signal 194 before delay calibration.

FIG. 5(6) is a timing diagram of product signal 196 before delay calibration.

FIG. 6(2) is a timing diagram of filter output 176 after delay calibration.

FIG. 6(3) is a timing diagram of qualifier output 182 after delay calibration.

FIG. 6(4) is a timing diagram of delayed signal 190 after delay calibration.

FIG. 6(5) is a timing diagram of clock signal 194 after delay calibration.

FIG. 6(6) is a timing diagram of product signal 196 after delay calibration.

FIG. 7(2) is a timing diagram of filter output 176 after delay calibration and before filter adjustment.

FIG. 7(3) is a timing diagram of qualifier output 182 after delay calibration and before filter adjustment.

FIG. 7(4) is a timing diagram of delayed signal 190 after delay calibration and before filter adjustment.

FIG. 7(5) is a timing diagram of clock signal 194 after delay calibration and before filter adjustment.

FIG. 7(6) is a timing diagram of product signal 196 after delay calibration and before filter adjustment.

FIG. 9(2) is a timing diagram of filter output 176 after filter adjustment.

FIG. 9(3) is a timing diagram of qualifier output 182 after filter adjustment.

FIG. 9(4) is a timing diagram of delayed signal 190 after filter adjustment.

FIG. 9(5) is a timing diagram of clock signal 194 after filter adjustment.

FIG. 9(6) is a timing diagram of product signal 196 after filter adjustment.

DETAILED DESCRIPTION OF THE PREFERRED EMBODIMENTS

Figure 1:
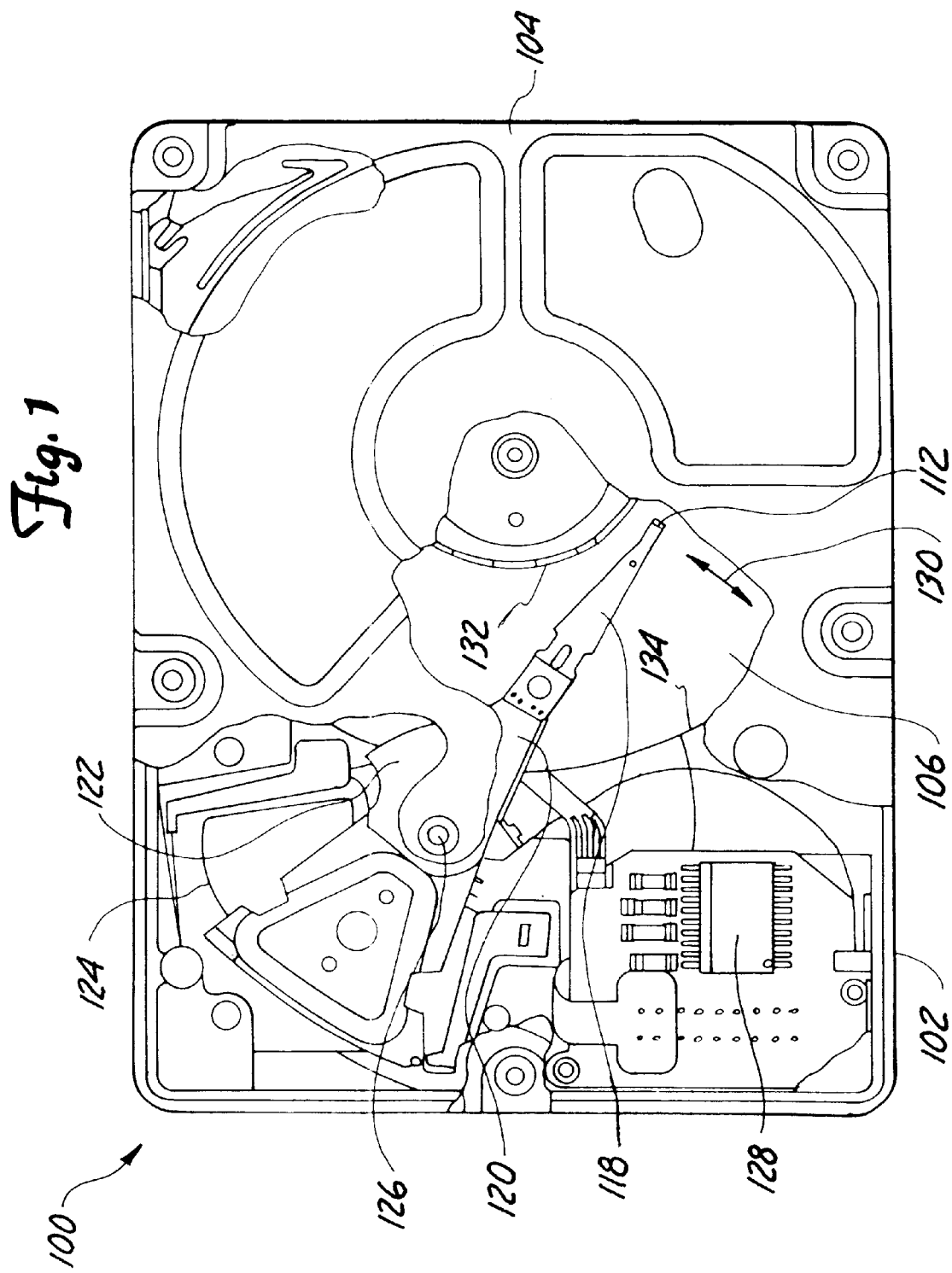
FIG. 1 is a plan view of a disc drive storage system.

FIG. 1 is a plan view of disc drive 100 according to the present invention. Disc drive 100 includes a housing with a base plate 102 and a top cover 104 (sections of top cover 104 are removed for clarity). Disc drive 100 further includes a disc pack 106, which is mounted on a spindle motor (not shown). Disc pack 106 may include a plurality of individual discs, which are mounted for co-rotation about a central axis. Each disc surface has an associated head gimbal assembly (HGA) 112, which is mounted to disc drive 100 for communication with the disc surface. Each HGA 112 includes a gimbal and a slider, which carries one or more read and write head. The HGAs 112 are supported by suspensions 118 which are in turn attached to track accessing arms 120 of an actuator assembly 122. Actuator assembly 122 is preferably an E-block assembly having multiple accessing arms. Actuator assembly 122 is rotated about a shaft 126 by an actuator 124, which is controlled by servo control circuitry 128 to position the heads at a desired data track on the disc. HGA 112 travels along an arcuate path 130 between a disc inner diameter 132 and a disc outer diameter 134.

Figure 2:
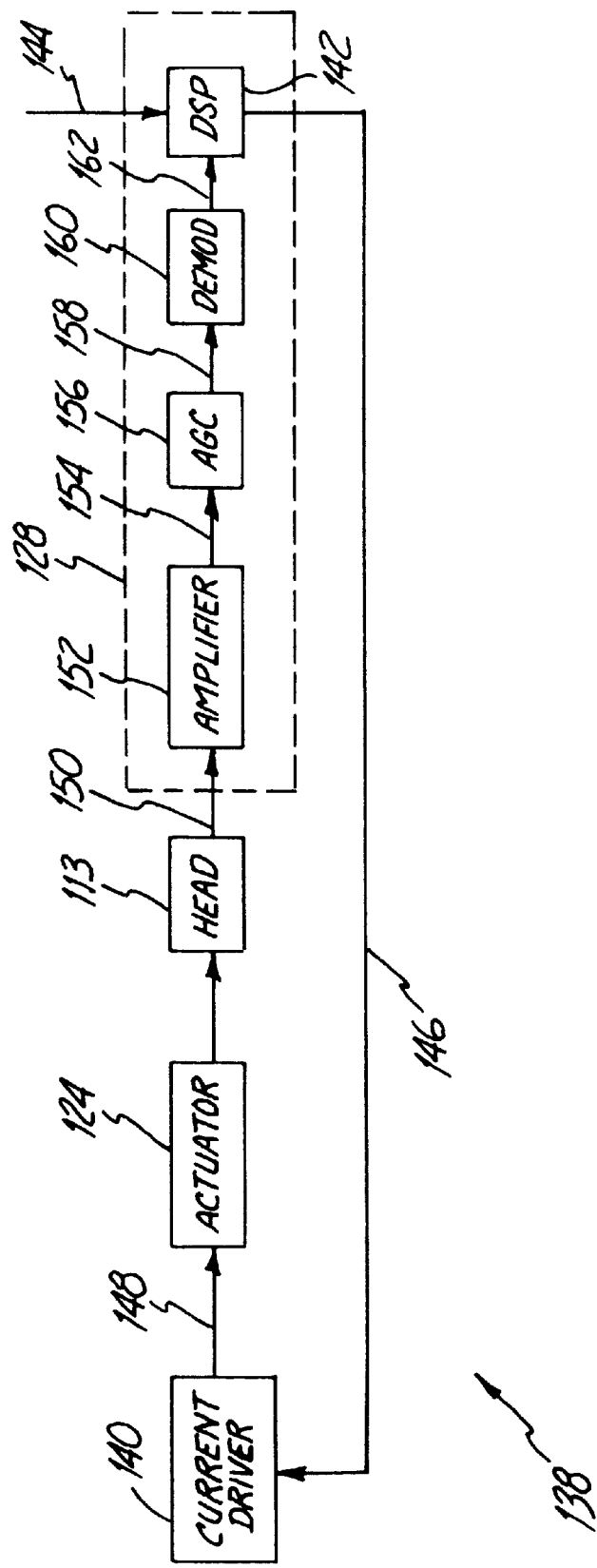
FIG. 2 is a block diagram of a servo loop of disc drive 100 of FIG. 1.

FIG. 2 is a block diagram of a servo loop 138 including servo circuitry 128, head 113, actuator 124 and current driver 140. Servo circuitry 128 includes a Digital Signal Processor (DSP) 142 that receives position requests from a remote processor (not shown) along data bus 144. The position requests include a desired location for head 113. Digital signal processor 142 stores a driver word 146 in current driver 140 that represents the distance and direction that digital signal processor 142 wants to move head 113. Current driver 140 creates a current 148 based upon driver word 146 that is passed through actuator 124 and causes actuator 124 to move head 113.

At its new position, head 113 reads servo information stored on the disc including but not limited to track identification codes, and position error signals. The position error signals typically take the form of repetitive transitions in the magnetic moments of the disc. Head 113 reads this servo information and provides servo read signal 150 to servo circuitry 128.

In particular, servo read signal 150 is provided to amplifier 152 of servo circuitry 128. Amplifier 152 amplifies servo read signal 150 and provides an amplified signal 154 to automatic gain control (AGC) 156. Automatic gain control 156 adjusts the average peak level so that the average peak level approaches a desired level.

Automatic gain control 156 provides a read signal 158 to demodulator 160. Demodulator 160 includes a phase-locked loop that generates a clock signal with the same frequency as read signal 158. Demodulator 160 recovers digital data fields, track identification values, cylinder identification values, and position error values based upon read signal 158.

Demodulator 160 conveys the position information to digital signal processor 142 along bi-directional serial port 162. Digital signal processor 142 uses this information to determine the current position of the head and creates a driver word 146 based on this determined position and the requested position found on data bus 144.

Servo loop 148 of FIG. 2 can be used either in a track seeking operation where digital signal processor 142 is attempting to move head 113 to a specific track or may be used in a track following operation where digital signal processor 142 attempts to maintain head 113 within a track on the disc.

Figure 3:
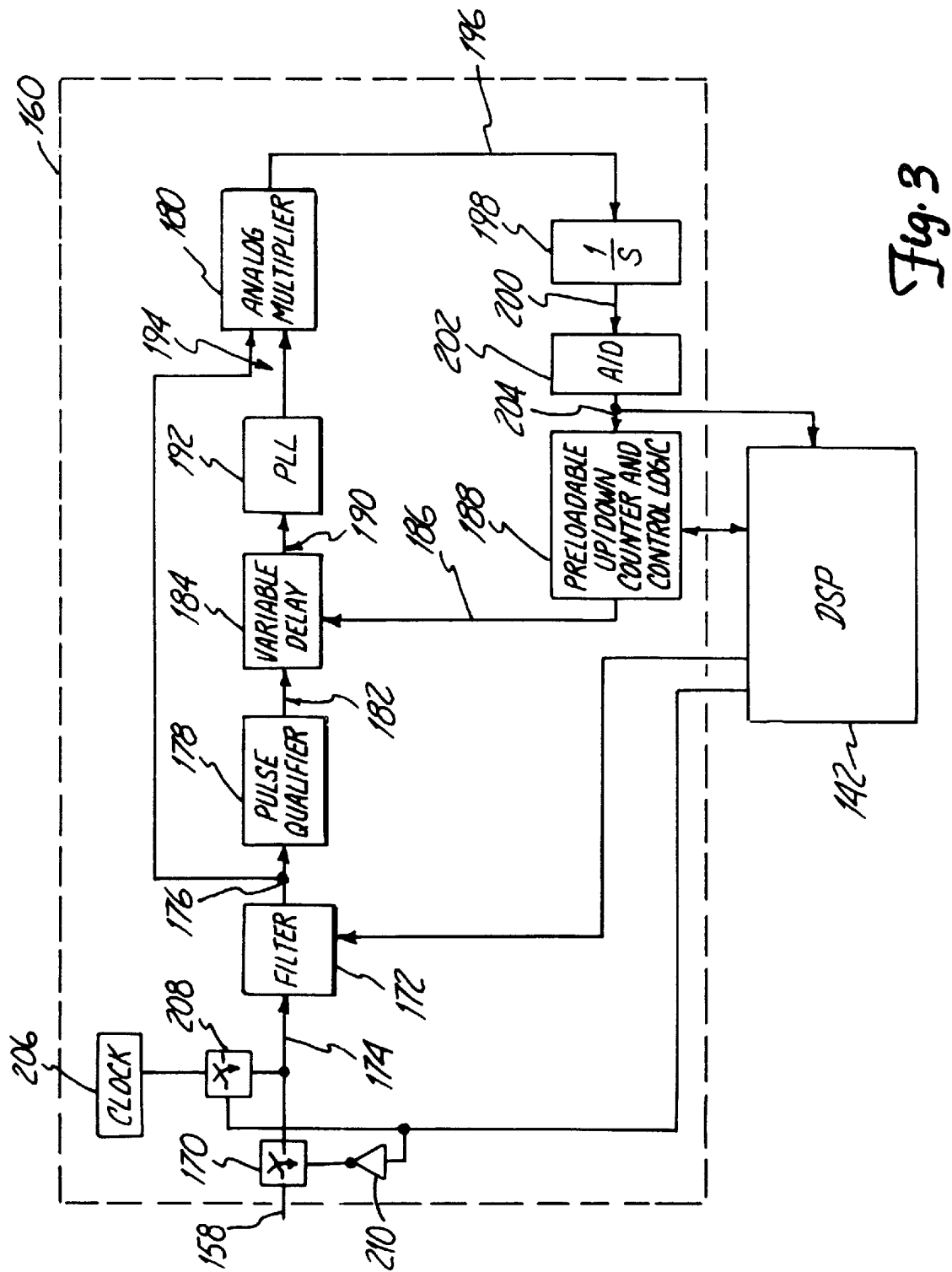
FIG. 3 is an expanded block diagram of demodulator 160 of FIG. 2.

FIG. 3 is an expanded block diagram of demodulator 160 of FIG. 2. In FIG. 3, serial port connection 162 between demodulator 160 and digital signal processor 142 is shown as several individual connections. Those skilled in the art will recognize that although a plurality of connections are shown, digital signal processor 142 is connected to demodulator 160 only through a single serial port. The multiple connections are shown simply to aid in understanding the invention.

Read signal 158 enters demodulator 160 through a switch 170. A read filter 172 is connected to switch 170 at a filter input 174. Filter input 174 is also connected to switch 208, which has a second terminal connected to a clock 206. Switches 170 and 208 are controlled by digital signal processor 142 through their respective control inputs. The two switches are always in opposite states as symbolized by inverter 210 at the control input to switch 170. Read filter 172 filters the signal on filter input 174 to produce a filter output 176 that is input to pulse qualifier 178 and to analog multiplier 180. Pulse qualifier 178 produces a one-shot pulse for each peak in filter output 176 to create qualifier output 182.

Qualifier output 182 is provided to variable delay 184 that also receives delay control 186 from control logic 188. Variable delay 184 delays qualifier output 182 based on delay control 186 to produce delayed signal 190, which is provided to phase-locked loop (PLL) 192. Phase-locked loop 192 generates a square-wave clock signal 194 that has half the frequency of the pulses in delayed signal 190. Clock signal 194 is input to analog multiplier 180 along with filter output 176.

Analog multiplier 180 multiplies filter output 176 by clock signal 194 to produce product signal 196. Product signal 196 is input to integrator 198, which integrates product signal 196 to produce integrand signal 200 that is input to analog-to-digital converter 202. Analog-to-digital converter 202 converts analog integrand signal 200 into digital integrands 204, which are provided to control logic 188. The integrand values can be used as an indication of the alignment between clock signal 194 and filter output 176, or the symmetry of the pulses on filter output 176. Based on the integrand values, control logic 188 produces delay control 186 which is provided to variable delay 184 in a manner discussed further below. Digital integrands 204 are also provided to digital signal processor 142, which uses these values to control filter 172 and control logic 188 in a manner discussed further below.

Figure 4:
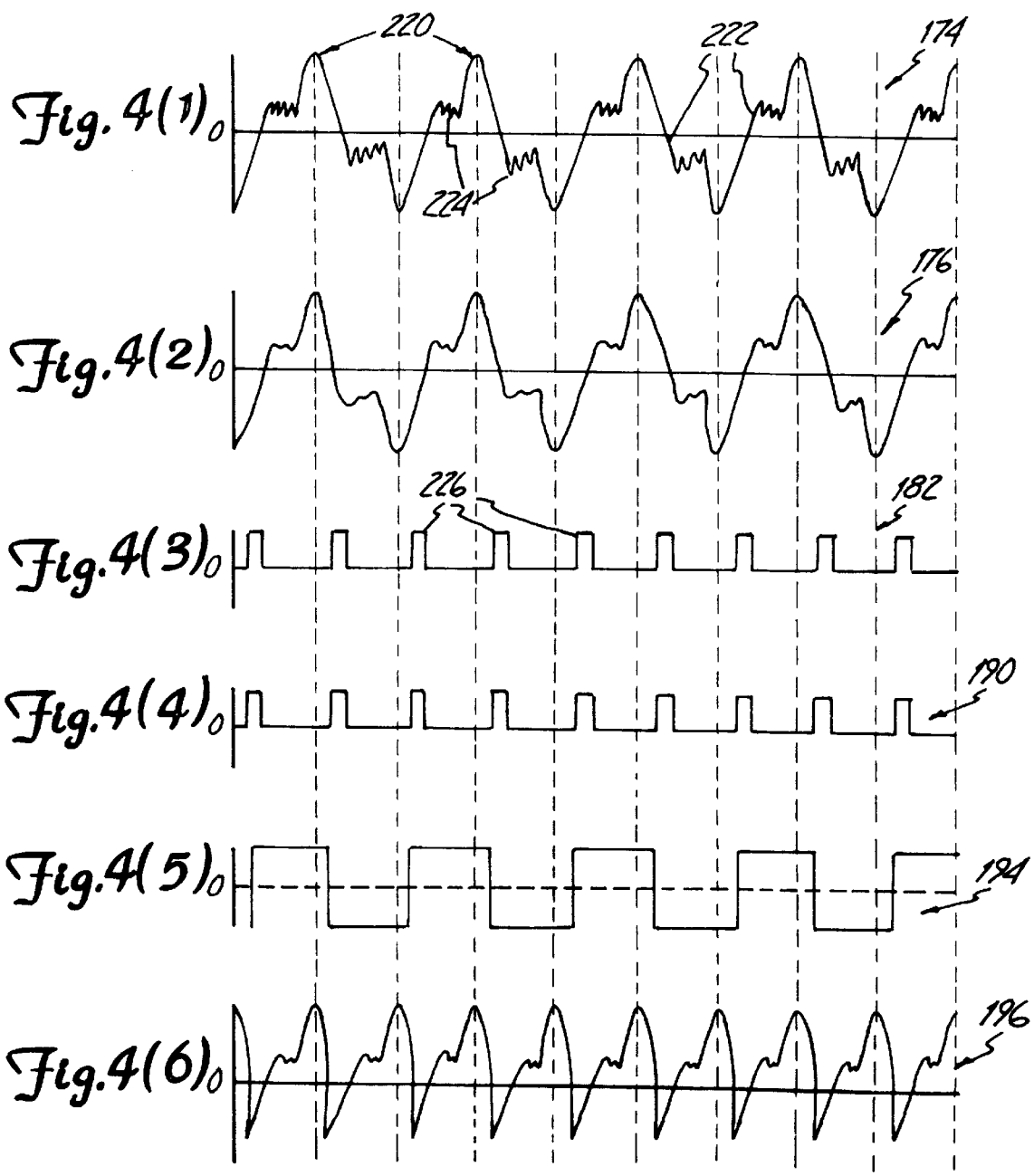
FIG. 4(1) is a timing diagram of a noisy read signal from AGC 156 of FIG. 2.
Figure 5:
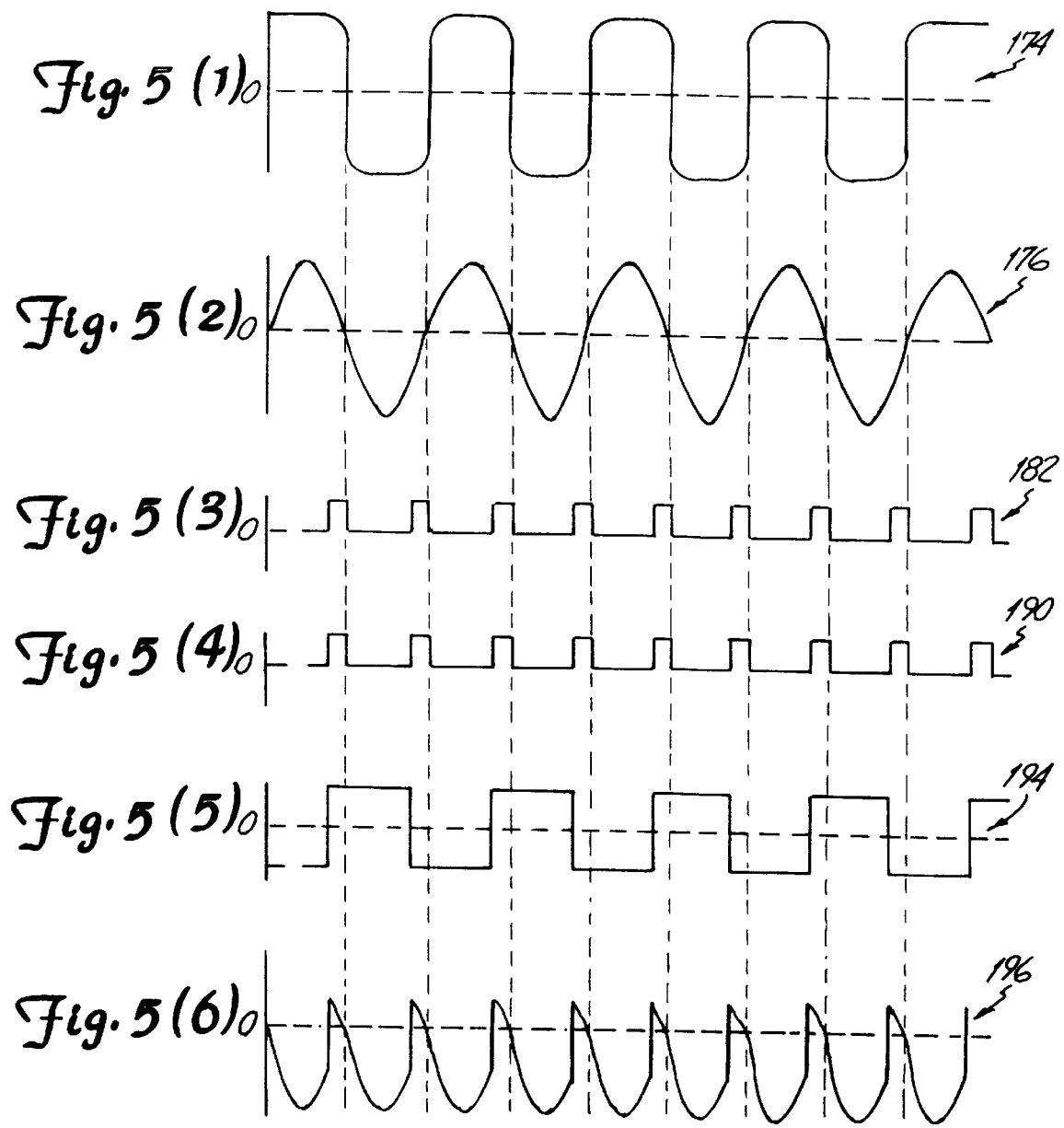
FIG. 5(1) is a timing diagram for a fixed clock signal at filter input 174 used during delay calibration.
Figure 6:
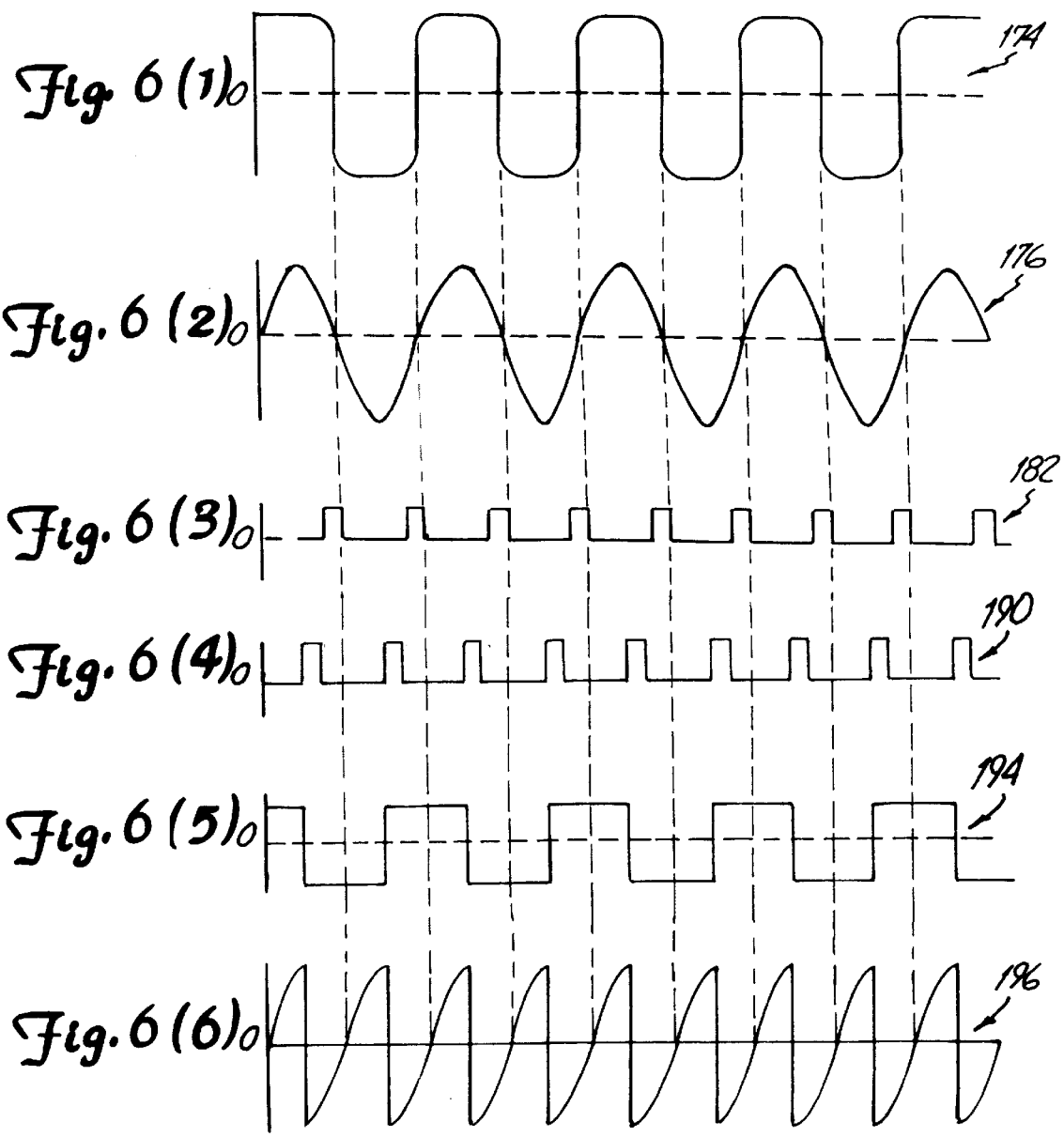
FIG. 6(1) is a timing diagram of a fixed clock signal on filter input 174 after delay calibration.
Figure 7:
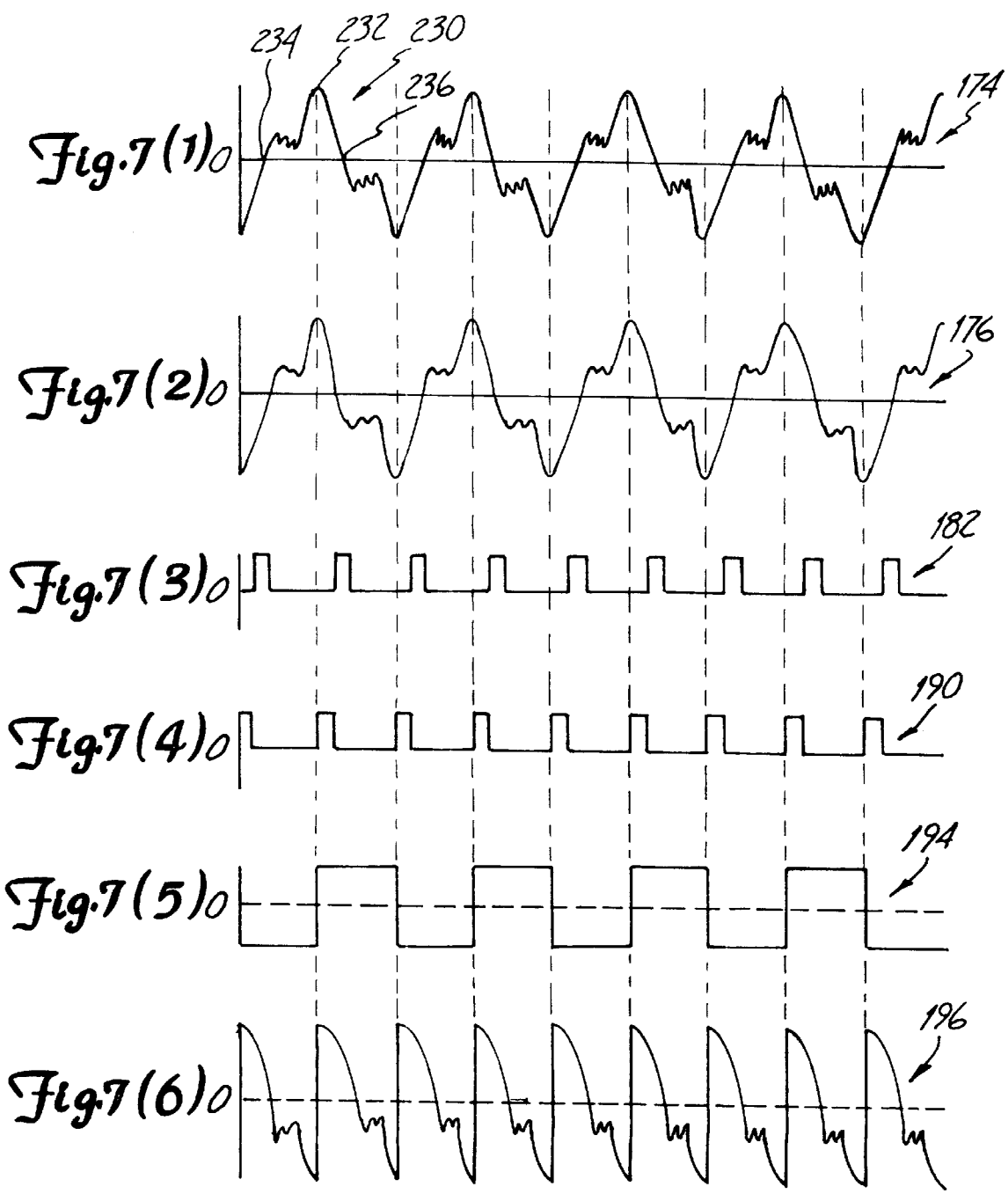
FIG. 7(1) is a timing diagram of read signal 158 at filter input 174 after delay calibration and before filter adjustment.
Figure 9:
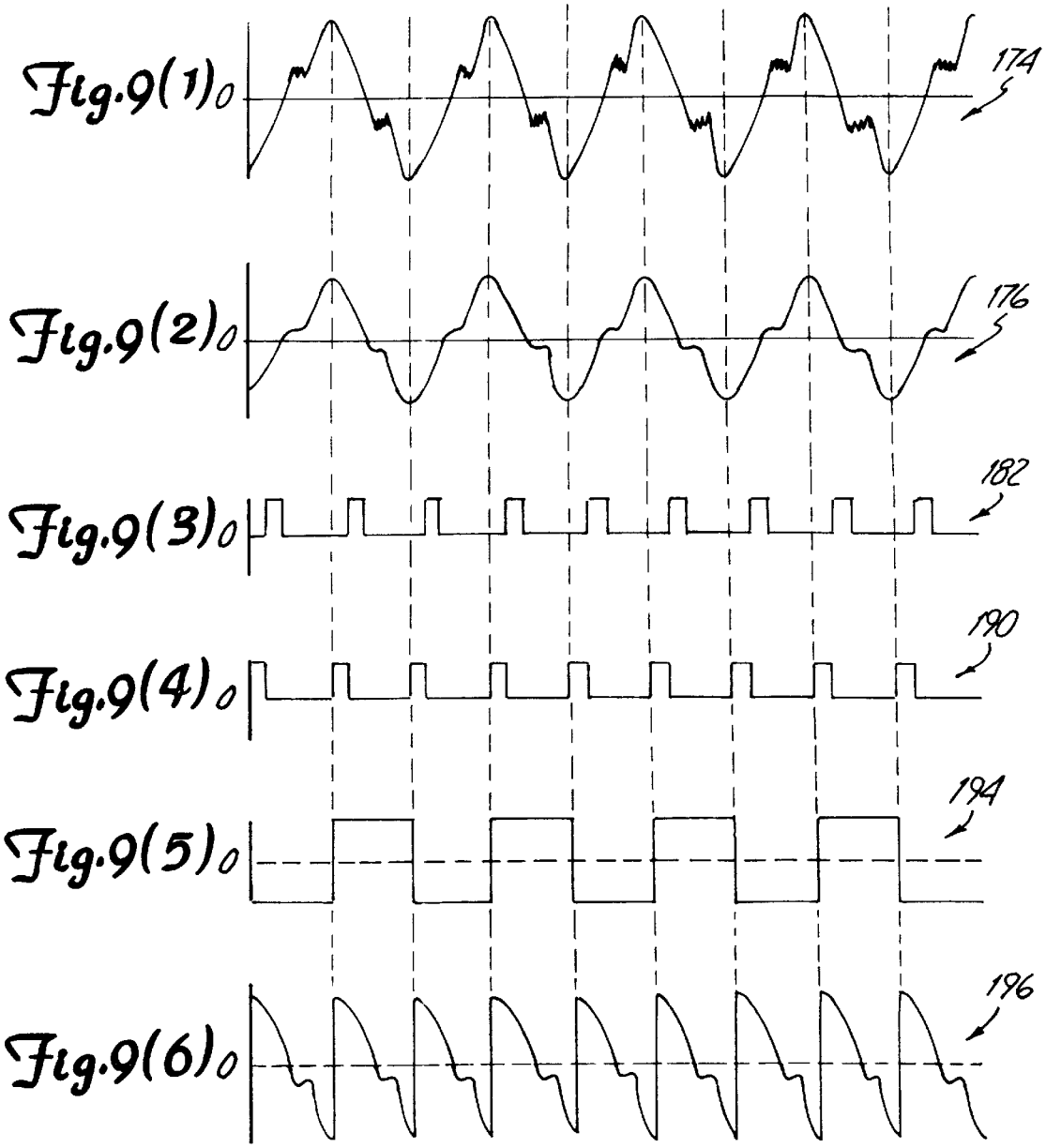
FIG. 9(1) is a timing diagram of read signal 158 at filter input 174.

The present invention provides a means for measuring pulse asymmetry. Preferred embodiments of the present invention are described through a series of timing diagrams showing the signals in demodulator 160. FIGS. 4(1) through 4(6) show these signals before demodulator 160 has been calibrated to detect pulse asymmetry. FIGS. 5(1) through 5(6) show these signals in the first stage of calibrating demodulator 160 so that it may detect pulse asymmetry. FIGS. 6(1) through 6(6) show these signals during the last stage of calibrating demodulator 160. FIGS. 7(1) through 7(6) show these signals during pulse asymmetry detection. FIGS. 9(1) through 9(6) show these signals after pulse asymmetry correction.

FIGS. 4(1) through 4(6) show signals in demodulator 160 before the demodulator has been calibrated to detect pulse asymmetry. Specifically, FIGS. 4(1), 4(2), 4(3), 4(4), 4(5) and 4(6) show signals on filter input 174, filter output 176, qualifier output 182, delayed signal 190, clock signal 194, and product signal 196, respectively. FIGS. 4(1) through 4(6) have a common horizontal time axis such that the portions of the signals that are aligned vertically occur at the same point in time. The vertical axis for each of the signals is measured in volts.

FIG. 4(1) is a graph of an example read signal 158, which appears on filter input 174 when switch 170 is closed and switch 208 is open. The signal of FIG. 4(1) has peaks 220, shoulders 222 and high frequency noise 224. Ideally, shoulders 222 and noise 224 should not exist. Note that read signal 158 is just one example of possible read signals. Those skilled in the art will recognize that different heads will cause different pulse asymmetry. For instance, some heads will have shouldering after the peaks instead of before the peaks as shown in FIG. 4(1).

Before filter adjustment, filter 172 is set at its maximum cut-off frequency. As such, filter 172 provides a minimum amount of filtering, which results in a reduction of some noise at the shoulders of filter input 174, but very little reduction in the shoulders themselves. The result of this minimal filtering is filter output 176 shown in FIG. 4(2).

FIG. 4(3) depicts qualifier output 182, which includes a series of pulses 226. Qualifier output 182 includes one pulse 226 for each peak detected by pulse qualifier 178. Because of the construction of pulse qualifier 178, pulses 226 are delayed from their respective peaks in filter output 176.

FIG. 4(4) depicts delayed signal 190, produced by variable delay 184. Before calibration, variable delay 184 does not delay qualifier output 182. As such, delayed signal 190 of FIG. 4(4) is identical to qualifier output 182.

FIG. 4(5) shows clock signal 194, which is generated by phase-locked loop 192 based on delayed signal 190. In particular, clock signal 194 has a frequency that is one-half the average frequency of pulses on delayed signal 190. Thus, each pulse in delayed signal 190 is associated with either a positive or negative transition in clock signal 194. Clock signal 194 is DC biased such that it is centered about ground.

FIG. 4(6) shows product signal 196, which is created by multiplying clock signal 194 of FIG. 4(5) by filter output 176 of FIG. 4(2). Because clock signal 194 is at the same frequency as the signal on filter output 176, their product, product signal 196, oscillates at twice their common frequency. In addition, because of shoulders 224, product signal 196 is positive most of the time.

To remove shoulders 222 and high frequency noise 224, the present invention first calibrates demodulator 160 so that it can detect pulse asymmetry. This calibration involves adjusting variable delay 184 so that transitions in clock signal 194 are aligned with the peaks of filter output 176. As shown below, this alignment will permit a determination of the symmetry of the pulses in filter output 176.

To calibrate variable delay 184, switch 170 is opened and switch 208 is closed so that filter input 174 carries a clock signal generated by clock 206. The clock signal is a filtered square wave, which provides a better data sample for aligning clock signal 194 with filter output 176. Preferably, the clock signal produced by clock 206 matches the expected servo frequency.

FIGS. 5(1) through 5(6) show the signals of demodulator 160 with the clock signal from clock 206 provided at filter input 174 before delay 184 has been calibrated. Each of the timing diagrams shares a common horizontal time axis. FIG. 5(1) depicts the clock signal on filter input 174, which is centered about 0.

FIG. 5(2) shows filter output 176, which is a filtered version of the clock signal from clock 206. In FIGS. 5(1) through 5(6), filter 172 has not been adjusted yet and as such performs a low-pass filter function with an initial cut-off frequency. In simulations, this initial cut-off frequency has been maximized at about 3.2 times the fundamental frequency of the position error signal. However, the initial cut-off frequency can be adjusted to accommodate changes in the method described below for tuning filter 172. In any case, filter 172 filters the clock signal from clock 206, producing a sinusoidal signal at filter output 176.

FIG. 5(3) shows qualifier output 182, which provides a single pulse for each peak in filter output 176. The pulses are not aligned with the peaks in filter output 176 because of delays found in pulse qualifier 178.

FIG. 5(4) shows delayed signal 190, which is identical to qualifier output 182 of FIG. 5(3) before variable delay 184 has been calibrated. Delayed signal 190 causes phase-locked loop 192 to generate clock signal 194 of FIG. 5(5). For each positive going transition in delayed signal 190, clock signal 194 has a transition. Preferably, clock signal 194 is centered about zero.

FIG. 5(6) shows product signal 196, which is produced by multiplying clock signal 194 of FIG. 5(5) with filter output 176 of FIG. 5(2). Because of the delay produced by pulse qualifier 178, product signal 196 is asymmetrical with smaller portions above zero and larger portions below zero.

Integrator 198 of FIG. 2 integrates product signal 196 of FIG. 5(6) to produce integrand signal 200, which is sampled by A-to-D converter 202. Because of the asymmetrical shape of product signal 196, integrand signal 200 will be a large negative value. Thus, digital integrands 204 produced by A-to-D converter 202 will contain a series of large negative values.

The negative values of digital integrands 204 cause control logic 188 to adjust the delay of variable delay 184 through delay control 186. This adjustment continues until the values of digital integrands 204 are equal to zero.

FIGS. 6(1) through 6(6) depict the signals of demodulator 160 when variable delay 184 has been adjusted so that digital integrands 204 are equal to zero. Specifically, FIGS. 6(1), 6(2) and 6(3) depict signals at filter input 174, filter output 176, and qualifier output 182, which are identical to the signals shown in FIGS. 5(1), 5(2) and 5(3), respectively.

FIG. 6(4) shows delayed signal 190 after variable delay 184 has been adjusted such that upward transitions in delayed signal 190 occur at the center of the positive and negative peaks of filter output 176. Based on delayed signal 190, phase-locked loop 192 produces clock signal 194, shown in FIG. 6(5), which has transitions aligned with the peaks in filter output 176 of FIG. 6(2).

Product signal 196 of FIG. 6(6) is the product of clock signal 194 and filter output 176. Since transitions in clock signal 194 occur at the peaks of the pulses of filter output 176, the positive and negative portions of product signal 196 are symmetrical relative to each other, and thus product signal 196 integrates to a value approaching zero.

When transitions in clock signal 194 are properly aligned with the center of the peaks in filter output 176, the amount of delay created by variable delay 184 is ideal for detecting asymmetry in the pulses of read signal 158. To maintain this delay during asymmetry detection, digital signal processor 142 disables the adjustment functions of control logic 188 so that the delay remains fixed. Digital signal processor 142 also opens switch 208 to remove the clock signal of clock 206 from filter input 174, then closes switch 170 permitting read signal 158 to pass through filter 174.

FIGS. 7(1) through 7(6) show graphs of various signals of demodulator 160 with the delay of variable delay 184 fixed at the delay shown in FIG. 6(4) and read signal 158 at filter input 174. In this state, demodulator 160 can detect pulse asymmetry as discussed below.

FIG. 7(1) depicts the read signal at filter 174, which has the shouldering and high frequency noise typically found in a read signal. Each pulse in the read signal is similar to pulse 230, with a peak 232 located between two zero crossings 234 and 236.

At this point, filter 172 has not been adjusted and remains in its initial low-pass configuration with an initial cut-off frequency. In this configuration, filter 172 removes some noise from the shoulders of filter input 174, resulting in filter output 176 of FIG. 7(2).

FIG. 7(3) shows qualifier output 182, which has a positive going transition for each peak in filter output 176 of FIG. 7(2). Delayed signal 190 of FIG. 7(4) is a delayed version of qualifier output 182 and the positive going transitions in delayed signal 190 are aligned with the peaks of filter output 176. FIG. 7(5) shows clock signal 194 generated by phase-locked loop 192 in response to delayed signal 190 of FIG. 7(4). The transitions of clock signal 194 are aligned with the peaks of filter output 176 and clock signal 194 is centered about zero.

FIG. 7(6) shows product signal 196, which is the result of multiplying clock signal 194 by filter output 176. Because the transitions of clock signal 194 are aligned with the peaks of filter output 176, product signal 196 has a cyclical nature with an abrupt transition from its most negative value to its most positive value. Because of this alignment, between transitions, product signal 196 includes the second half of one peak and the first half of the next successive peak in filter output 176. In addition, across product signal 196, the peek halves have opposite polarity, such that the same peak half, either the first half or second half, is positive between each transition, and the other half is negative between each transition.

Because the peak halves have opposite polarities, asymmetries between the peak halves cause digital integrands 204 to have non-zero values. With specific reference to product signal 196 of FIG. 7(6), if the area under the first half of the peaks is generally larger than the area under the second half of the peaks, digital integrands 204 will be negative. If the area under the second half of the peaks is generally larger than the area under the first half of the peaks, digital integrands 204 will be positive.

Since each pulse generally has the same shape, asymmetries between the second half of one pulse and the first half of another pulse are the same as asymmetries between the two halves of a single pulse. Thus, by evaluating digital integrands 204, it is possible to determine asymmetries in the shapes of the pulses of the read signal. The amount of asymmetry can be used as a measure of head instability since asymmetry generally increases with head instability.

Specifically, in the present invention, the values of digital integrands 204 are compared against a baseline value to determine if they are within specified range for the disc drive. Integrands that are outside of the specified range indicate that the read head is unstable and that it should be replaced. The baseline value is either set for all disc drives in a line of disc drives or is created from integrands produced by each individual drive during initial drive testing. For drives that have a baseline value derived for an entire line of drives, read heads can be evaluated at initial burn-in and rejected if they do not produce sufficiently symmetrical pulses.

The performance of a read head may be determined multiple times over the life of its respective drive. A head may be considered unstable if its respective integrands are not within a specified range of the baseline value or if a current set of integrands is excessively different from a previous set of integrands. The determination of whether a head is unstable is preferably performed by DSP 142 of FIG. 3.

The pulse asymmetry may also be monitored while making filter adjustments to achieve the best possible pulse symmetry. During such filter adjustments, digital signal processor 142 adjusts the filter parameters of filter 172 to minimize digital integrands 204. The adjusted filter parameters include the cut-off frequency, $F_c$, the boost, α, and the group delay, β. The cut-off frequency is the frequency at which the gain of the filter drops three decibels from its DC value. The boost and group delay are coefficients describing the transfer function of filter 172. In particular, boost, α, and group delay, β, are found in the generalized transfer function:

$$\frac{-\alpha_s^2 - \beta s + c}{(f(s))} \qquad \text{Eq. 1}$$

where s is frequency(jw), and f(s) is a function of frequency that depends on the particular filter used. Boost, α, creates a peak in the magnitude of the filter gain just prior to the cut-off frequency of the filter. Group delay, β, causes a phase shift for certain groups of frequencies.

In preferred embodiments, digital signal processor 142 changes the filter parameters of filter 172 by writing to three separate registers each dedicated to one of the filter parameters: frequency cut-off, group delay, or boost. In preferred embodiments each of the registers is a four-bit register, which is able to accommodate 16 different values. Each of the 16 values of each register is associated with a separate value for its respective filter parameter.

Digital signal processor 142 adjusts the filter parameters in response to digital instructions that can be part of a manufacturing code that is used by digital signal processor 142 only during burn-in of the disc drive and is dumped before being shipped to the customer. Alternatively, the code may remain in the disc drive and may be used during recovery processes if the head fails or if the head appears to fail and requires field diagnosis.

There are several ways to minimize digital integrands 204. The most straight forward way is to try every possible combination of cut-off frequency, boost, and group delay possible in filter 172 and determine which combination provides the lowest integrand values. Alternatively, an initial combination of filter parameters may be chosen and from that initial combination, one filter parameter at a time may be changed to determine the integrand values surrounding the first selected point. The parameters that produce the lowest neighboring integrand value are then selected and the process is repeated until a minimum integrand value is found.

A third option, sometimes called a steepest descent approach or gradient approach, begins by selecting a starting set of filter parameters, and again creating a set of neighboring integrand values by individually changing each of the parameters. The filter parameters that produce the greatest decrease in the integrand values are used to create a direction of change in the parameter values. The parameter values are then changed in accordance with that direction. The magnitude of the change in parameters is driven by the amount of change in the integrand values between the initial chosen point and the subsequent chosen point.

Figure 8:
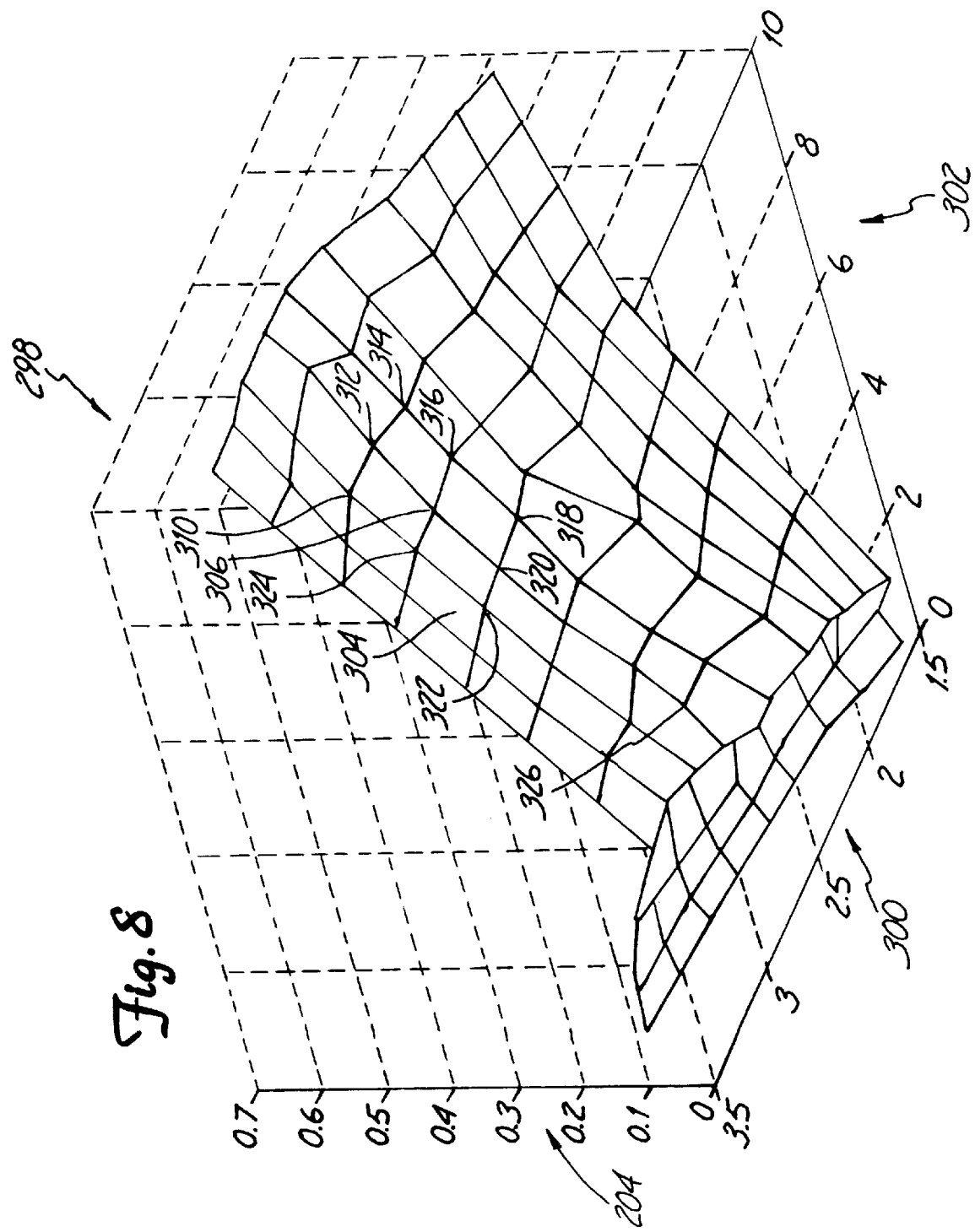
FIG. 8 is a three-dimensional graph showing a two-variable surface defined by two filter parameters.

This third technique is shown in FIG. 8, which shows a graph 298 of digital integrands 204 as a function of cut-off frequency, $F_c$, shown along axis 300 and group delay, $\beta$, shown along axis 302. For three-dimensional graph 298, boost is a constant. Although boost is a constant in graph 298, those skilled in the art will recognize that graph 298 is merely illustrative of a method that treats all three filter parameters as variables and is shown because the effects of all three variables on the integrand values cannot be shown without a four dimensional illustration.

In three-dimensional graph 298, digital integrands 204 reside along a surface 304 where an initial point 306 is chosen. The set of integrand values near point 306 includes points 310, 312, 314, 316, 318, 320, 322 and 324. Since point 320 provides the greatest decrease in digital integrands 204 from point 306, the direction of change in the filter parameters would be in the direction from point 306 to point 320. In addition, based on the steepness of the change from point 306 to point 320, a point such as point 326 is chosen as the next tested filter parameter combination. At point 326, this process is repeated until a minimum is achieved.

Once a minimum is found, the filter parameters that achieved that minimum are recorded. One aspect of the present invention allows different filter parameters to be used when the head is at different radial locations on the disc. This allows the present invention to accommodate changes in pulse asymmetry that arise as the head moves to different radial locations on the disc. In this form of the invention, a set of filter parameters is determined and recorded for each desired radial position range on the disc.

Another aspect of the present invention is that different filter parameters may be recorded and used for different heads in the disc drive if more than one head is present. This allows the present invention to accommodate differences in pulse asymmetry that arise due to manufacturing tolerances in producing certain types of heads as well as differences in pulse asymmetry that arise due to differences in the physical structure of different types of heads.

When a minimum digital integrand value has been located, demodulator 160 contains the signals shown in FIGS. 9(1) through 9(6). Specifically, read signal 158, which is carried on filter input 174 and is shown in FIG. 9(1), is filtered by filter 172 to produce filter output 176, which is shown in FIG. 9(2). As shown in FIG. 9(2), much of the high shouldering and high frequency noise of read signal 158 has been reduced or eliminated by filter 172. The reduction in shouldering and high frequency noise is due to the adjustments made to the filter parameters of filter 172.

Qualifier output 182 shown in FIG. 9(3) has a pulse for each peak in filter output 176, where each pulse is delayed because of pulse qualifier 178. Delayed signal 190 of FIG. 9(4) is a delayed version of qualifier output 182 and has its positive going transitions aligned with the peaks of filter output 176. From delayed signal 190, phase-locked loop 192 produces clock signal 194 of FIG. 9(5), which has transitions aligned with the peaks of filter output 176. Product signal 196, which is produced by multiplying clock signal 194 of FIG. 9(5) by filter output 176 of FIG. 9(2), is shown in FIG. 9(6). Product signal 196 has transitions from its most negative points to its most positive points, and between each pair of transitions, one period of product signal 196 includes the second half of one pulse and the first half of the next successive pulse in filter output 176. Although the two halves of the pulse are not perfectly symmetric, and their resulting integrand values are non-zero, they are more symmetric and less noisy than the pulses at filter input 174.

Figure 10:
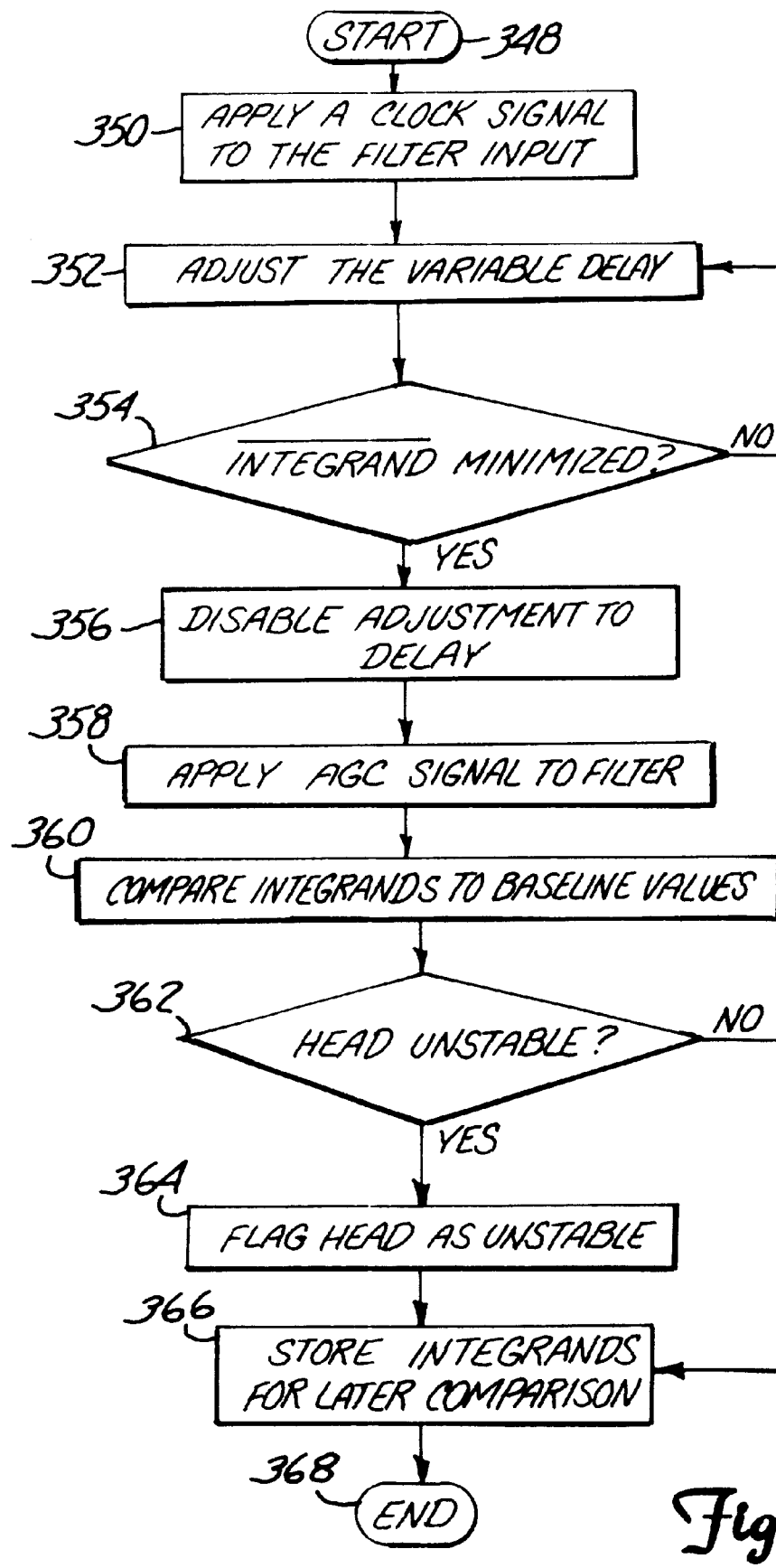
FIG. 10 is a flow diagram for determining pulse asymmetry and head instability.

FIG. 10 shows a summary of steps 348 through 368 for a method of determining pulse asymmetry and head instability. The method starts at step 348 and progresses to step 350. In step 350, a clock signal is applied to filter input 174 of filter 172. In step 352, the delay of variable delay 184 is adjusted. If the integrand values produced by A-to-D converter 202 are not minimized in decision box 354, the variable delay is adjusted again. If the integrand values are minimized, the adjustments to variable delay 184 are disabled at step 356 so as to set the amount of delay at the point where the integrand values are minimized. In step 358, the clock signal is removed and the read signal is applied to filter 172. In step 360, digital signal processor 142 determines the amount of pulse asymmetry in the read signal by comparing the integrands to a baseline value. If the integrand values are excessively different from the baseline value in decision box 362, the head is flagged as being unstable in step 364. If the integrand values are not excessively different from the baseline value in decision box 362 or after the head has been flagged as unstable in step 364, the integrands are stored in step 366 for later comparison. The method ends at a step 368.

In summary, the invention includes a method for determining the performance of a head that produces a read signal 158. In the method, the read signal 158 is multiplied by a time varying signal 194 to produce a product signal 196. Product signal 196 is integrated to produce test integrands 204, which are compared against a baseline value to determine head performance.

The invention also includes a device 160 for determining pulse asymmetry of pulses in a read signal 158. Device 160 comprises a signal generator 178, 184, 192 receptive of read signal 158, which produces a rectification signal 194. Device 160 also comprises an analog multiplier 180 that multiplies rectification signal 194 by read signal 158 to produce a product signal 196. An integrator 198, 202 integrates product signal 196 to produce integrands 204 that are representative of pulse asymmetry. Comparison means 142 compare the integrands 204 to the baseline value to determine the performance of the head.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the filtering system while maintaining substantially the same functionality without departing from the scope and spirit of the present invention. In addition, although the preferred embodiment described herein is directed to a servo loop for a data storage system, it will be appreciated by those skilled in the art that the teachings of the present invention can be applied to other systems, like satellite or telecommunication systems, without departing from the scope and spirit of the present invention.

What is claimed is:

1. A method for determining performance of a magnetic recording head producing a read signal, the method comprising steps of:

(a) multiplying the read signal by a time varying signal to produce a product signal;

(b) integrating the product signal to produce test integrands; and (c) comparing the test integrands against a baseline value to determine performance of the head.

2. The method of claim 1 wherein the time varying signal has transitions at the peaks of the read signal.

3. The method of claim 2 wherein the transitions of the time varying signal are aligned with the peaks of the read signal through the steps of:

replacing the read signal with a fixed frequency square wave;

multiplying the fixed frequency square wave by the time varying signal to produce an alignment product signal;

integrating the alignment product signal to produce alignment integrands;

adjusting the phase of the time varying signal relative to the fixed frequency square wave so that the alignment integrands are minimized; and replacing the fixed frequency square wave with the read signal.

4. The method of claim 1 wherein steps (a), (b) and (c) are repeated.

5. The method of claim 4 wherein comparing the test integrands against a baseline value comprises subtracting the baseline value from the test integrands to produce performance values, and wherein changes in the performance values between repetitions of steps (a), (b), and (c) are indicative of the performance of the head.

6. The method of claim 5 wherein an excessive change in the performance values between repetitions of steps (a), (b), and (c) indicates that the head is unstable.

7. A device for determining pulse asymmetry of pulses in a read signal produced by a magnetic recording head, the device comprising:

a signal generator, receptive of the read signal, for producing a rectification signal based on the read signal;

an analog multiplier, having first and second inputs and an output, the first input coupled to the signal generator and receptive of the rectification signal and the second input receptive of the read signal, the analog multiplier capable of multiplying the rectification signal by the read signal to produce a product signal at the output of the analog multiplier; and an integrator having an input, the input of the integrator coupled to the output of the analog multiplier, the integrator capable of integrating the product signal to produce integrands representative of pulse asymmetry.

8. The device of claim 7 wherein the signal generator comprises a phase-locked loop in series with a variable delay circuit.

9. The device of claim 8 wherein transitions in the rectification signal occur during peaks in the read signal.

10. The device of claim 7 further comprising a comparison means for comparing the integrands to a base value to determine the performance of a head.

11. The device of claim 10 wherein the integrands are compared to the base value during an initial test of a disc drive.

12. The device of claim 11 wherein the base value is equal to a value of an integrand produced by the integrator during an initial test of the disc drive.

13. The device of claim 10 wherein integrands are compared to the base value a plurality of times during the operation of a disc drive.

14. The device of claim 13 wherein the comparison means determines that a head is unstable if a first integrand produced at a first point in time differs from a second integrand produced at a second point in time by more than a prescribed amount.

* * * * *

UNITED STATES PATENT AND TRADEMARK OFFICE
CERTIFICATE OF CORRECTION

PATENT NO.   : 6,249,392 B1   Page 1 of 1
DATED        : June 19, 2001
INVENTOR(S)  : Sacks et al.

It is certified that error appears in the above-identified patent and that said Letters Patent is hereby corrected as shown below:

Column 8,
Line 35, replace Eq. 1 with: $$\frac{-\alpha s^2 - \beta s + c}{(f(s))}$$

Signed and Sealed this

Fifth Day of March, 2002

Attest:

Attesting Officer

JAMES E. ROGAN
Director of the United States Patent and Trademark Office